United States Patent [19]

Ludwig et al.

[11] Patent Number: 4,475,953

[45] Date of Patent: Oct. 9, 1984

[54] EMULSION AND METHOD OF MAKING SAME

[75] Inventors: Allen C. Ludwig; Larry W. Wolter; Henry F. Frazier, all of San Antonio, Tex.

[73] Assignee: Southwest Research Institute, San Antonio, Tex.

[21] Appl. No.: 469,216

[22] Filed: Feb. 24, 1983

[51] Int. Cl.$^3$ ................................................ C09K 3/00
[52] U.S. Cl. ........................... 106/287.24; 106/287.32; 106/287.23; 260/139; 528/389
[58] Field of Search .................. 260/139; 106/287.32, 106/274, 287.24, 287.23; 528/389; 501/140

[56] References Cited

U.S. PATENT DOCUMENTS

| | | | |
|---|---|---|---|
| 1,832,807 | 11/1931 | Ellis | 501/140 |
| 4,290,816 | 9/1981 | Ludwig et al. | 260/139 |
| 4,387,167 | 6/1983 | Kidwell | 106/287.32 |

OTHER PUBLICATIONS

Highway Binder Materials from Modified Sulfur-Water Emulsions, Final Report Apr. 1982.

*Primary Examiner*—Theodore Morris
*Attorney, Agent, or Firm*—Hubbard, Thurman, Turner & Tucker

[57] ABSTRACT

The invention relates to an emulsion and a method of making same based on adding water to a sulfur reaction product, the latter being prepared by reacting certain first and second hydrocarbons with elemental sulfur.

19 Claims, No Drawings

EMULSION AND METHOD OF MAKING SAME

This invention relates to an emulsion of water in an asphalt-like material, the latter being the reaction product of at least first and second hydrocarbons with elemental sulfur. The invention also relates to a method of making such an emulsion.

In U.S. Pat. No. 4,290,816, by Allen C. Ludwig, John M. Dale, and Henry F. Frazier, there is disclosed and claimed an asphalt-like material which is prepared by reacting certain hydrocarbons with elemental sulfur. The resulting reaction product (hereinafter generically referred to as "sulfur reaction product") has properties which enable it to substitute for asphalt or portland cement in certain applications, such as paving of roads.

With the knowledge that the sulfur reaction product possessed certain physical properties comparable to those of asphalt, attempts were made to emulsify the sulfur reaction product in water using the standard prior art techinques for emulsifying asphalt in water. Thus, emulsifiers which had been used to form the prior water-asphalt emulsions were added to or prepared in a heated water phase. Then heated sulfur reaction product was added to the water phase in an attempt to prepare the emulsion. Alternatively, the emulsifier was added to the sulfur reaction product and then this mixture was added to water, all at an elevated temperature somewhat below the boiling point of water. Some of these attemmpts to emulsify water and sulfur reaction product were successful and some were not. At that time, it was believed that the secret to success was in the selection of a particular emulsifier or soap as the emulsifying agent. In summary, when the sulfur reaction product was used in standard asphalt emulsion techniques, its addition to water in the presence of selected emulsifiers would sometimes result in satisfactory emulsions and at other times in a mixture which would not emulsify.

It was unexpectedly found that by reversing the order of addition, i.e., by adding water to the sulfur reaction product, an almost instant emulsion resulted even in the absence of any added emulsifiers. Subsequent experiments demonstrated that while the emulsion was very easily formed, only about 20 weight percent of water could be added to the sulfur reaction product. While this amount of water could be adequate for certain applications such as caulks and sealants, further viscosity reduction is desirable for other applications.

It was further found that the amount of water which could be emulsified into the sulfur reaction product could be increased to as much as 50 weight percent of water by the addition of minor amounts of certain hydrocarbon solvents, and that this could be achieved without the addition of any added emulsifiers. This was an unexpected result in that the sulfur reaction product itself is hydrophobic and likewise the hydrocarbon solvents are hydrophobic. It was not expected that the mixture of two hydrophobic substances would increase the amount of water which could be emulsified with the sulfur reaction product. At any rate, the resultant emulsions with the higher water content are pourable at room temperature and have very desirable viscosities for numerous applications including coatings and binders.

It was further found that wetting agents could be added to the emulsions to improve their wetting characteristics so that the emulsions would preferentially wet certain materials such as sand and limestone aggregates. Since the emulsions do not require an emulsifier in their formation, the wetting agents could be chosen for their wetting characteristics rather than any emulsifying power they may have and yet obtain a satisfactory product. This is particularly important for two reasons: first, the wetting agent could be chosen without reference to its emulsifying properties so as to obtain optimum wetting characteristics. Second, many wetting agents tend to destabilize emulsions and such was not found to be the case with these particular sulfur reaction product emulsions.

SULFUR REACTION PRODUCT

The base starting material is disclosed in the foregoing Ludwid et al. U.S. Pat. No. 4,290,816 and the disclosure therein is incorporated herein by reference thereto for all purposes.

Thus, in making the sulfur reaction product, a first hydrocarbon, which is co-reacted with sulfur along with a second hydrocarbon, is one which, when reacted with sulfur by itself, forms a gel. The term "gel" means a product which is brittle though rubber-like but is irreversible in that upon reheating, it retains its solid character and does not revert to a liquid. Exemplary of the first hydrocarbons are polyunsaturated hydrocarbons which are diolefins or triolefins having 4 to 20 carbon atoms per molecule such as butadiene, hexadiene, octadiene, and the like. Also included are cyclodiolefins (or cyclotriolephins) having from 4 to 20 carbon atoms per molecule such as dicyclopentadiene, methylcyclopentadiene, 1,5 cyclooctadiene, 1,5,9 cyclododecatriene, myrcene, 1,7 cyclooctadiene and the cycloolefins having a double bond reactive with sulfur in a side chain such as a vinyl or allyl groups such as 4-vinyl cyclohexene-1. Also there can be employed aryl hydrocarbons having two or more olefinic side chains such as divinyl benzene, diallyl benzene, and the like. The amount of the first polyunsaturated hydrocarbon to be used should be in the range of 5 to 20 weight percent of the sulfur reaction product, preferably 10 to 15 weight percent.

The second hydrocarbon, which has one or more unsaturated groups reactable with sulfur, is one which when reacted by itself with sulfur does not produce a gel but instead produces a hard or brittle material which has physical characteristics substantially different from those of asphalt. However, when it is reacted with sulfur along with the first hydrocarbon, it prevents a gel from forming. Among such materials are the monoolefins having from 2 to 20 carbon atoms per molecule such as butene, octene and the like, the cyclomonoolefins having from 4 to 20 carbon atoms per molecule such as cyclopentene, cyclooctene, alpha and beta pinene and the like; aryl hydrocarbons having an olefinic side chain such as vinyl benzene, vinyl toluene, allyl benzene, allyl toluene and the like, and dipentene, which is preferred. Again the amount to be employed should be in the range of 5 to 20 weight percent of the sulfur reaction product and preferably within the range of 10 to 15 weight percent. Also, the total amount of the first and second hydrocarbons should be in the range of 25 to 30 percent based on the weight of the sulfur reaction product.

A sulfur reaction product can be made by mixing together the elemental sulfur and the first and second hydrocarbons and the reaction initiated by heating the mixture to a temperature in the range of 120° to 200° and sufficiently high to cause an exothermic reaction to take place. After this reaction begins, further heating may not be required and in some cases, it may be necessary to cool the mixture to prevent overheating. The reaction time will, of course, vary with the reaction temperature, but normally a time within the range of 1 to 8 hours is sufficient. In some cases, it may be desirable to add to the reaction mixture a minor but sufficient amount of a catalyst to accelerate the reaction. One particularly desirable way of providing the catalysis is simply to conduct the reaction in a vessel in which prior batches of the products have been prepared so that the residue in the vessel can act as the catalyst.

The sulfur reaction product, as indicated above, has physical properties similar to asphalt. Thus, it has a viscosity-temperature curve approximating that of asphalt, a penetration of 5 to 100 as defined by ASTM D-5, a softening point of from 10° C. to a 70° C. as defined by ASTM D-36, and a ductility of at least 100 as defined by ASTM D-113.

SOLVENT

As indicated, the use of an added solvent is indicated when it is desired to increase the water content of the emulsion, such as from about 20 percent to 50 weight percent. The solvent selected should be one which is miscible with the sulfur reaction product when the latter is in a melted condition. Thus, such solvents as vinyl toluene, toluene, xylene, creosote have been used and found to be readily miscible with the sulfur reaction product. Other solvents will also work, including kerosene, petroleum naptha as well as the various hydrocarbons mentioned above and identified in the families of the first and second hydrocarbons which are reacted with the sulfur. In some cases, the mixing of the solvent with the sulfur reaction product may be enhanced by mixing at an elevated temperature up to about 100° C., although higher temperatures can be employed if the mixing is done in a closed vessel to prevent the escape of water and the solvent. Specific solvents other than those enumerated above can be chosen by simply selecting a known solvent and testing its miscibility with the sulfur reaction product.

WETTING AGENT

Conventional asphalt emulsions used in the laying of roads have the advantage that they can be applied to or mixed with an aggregate at ambient atmospheric temperature. This saves enormous amounts of energy when contrasted to the typical hot asphalt-aggregate operation. However, asphalt emulsions frequently include emulsifiers to stabilize the emulsion. When the stabilized emulsion is applied to aggregate, the asphalt must be preferentially wet the aggregate and eventually the water in the emulsion must breakout and evaporate. Due to the presence of the emulsifiers tending to stabilize the emulsion, the breakout may be deferred and somewhat difficult to accomplish. With the composition of this invention, the emulsions are not stabilized with emulsifiers as such. By adding suitable wetting agents, the emulsion will preferentially wet many aggregates and the breakout of the water will be facilitated rather than hindered by conventional emulsifiers. Therefore, a surfactant having wetting powers can be chosen without regard to any emulsifying powers it may have. As is known, the best emulsifying agent is seldom, if ever, the best wetting agent.

Soaps that have been successfully used as wetting agents include the sodium, potassium, and ammonium salts of oleic and stearic acids. And these can be defined as a group as water soluble or water dispersible alkali metal and ammonium salts of long chain fatty acids having from 15 to 20 carbon atoms per molecule. Surfactant wetting agents also include the alkali and ammonium salts of ethoxylated alkylphenols, sulfated nonylphenxypoly(ethyleneoxy)ethanol, various phosphate esters, as well as wetting agents of the laurate, palmitate stearate, and oleate types. Certain alcohols and glycols have also been successfully used including ethylene glycol, glycerin and dicyclopentadiene alcohol. Generally wetting agents are well known in the art and have varying degrees of wetting power. Accordingly, one skilled in the art can select a suitable wetting agent merely by reference to those known in the art and routine testing with the composition of this invention.

Equipment for making the sulfur reaction product can be any that promotes a mixing action such as a blender, a centrifugal pump, ultrasonic mixers, and colloid mills.

EXAMPLES

The following sulfur reaction products were made by simply adding the ingredients together in a mixer, heating the contents of the mixture until the exothermic action began and then allowing the reaction to proceed at a temperature of about 150° C.

| #126 | #233 | #233A |
|---|---|---|
| 61% Sulfur | 70% Sulfur | 68% Sulfur |
| 13% DCPD* | 12% DCPD | 12% DCPD |
| 13% VT* | 10% Dipentene | 10% Low purity Dipentene |
| 13% Coal Tar | 8% VT | 10% VT |

*DCPD-dicyclopentadiene, VT-vinyl toluene

EXAMPLE 1

200 grams of sulfur reaction product π233A were heated to approximately 95° C. and then 44 grams of tap water (heated to a temperature of about 80° C.) were added slowly while stirring with a variable speed mixer. The material emulsified almost immediately. The resultant product at room temperature was viscous but pliable. It could be applied with a spatula as a caulk or sealant.

EXAMPLE 2

200 grams of sulfur reaction product #126 at 95° C. and 10 grams of xylene were first added together and mixed. To this mixture, 70 grams of water at 80° C. were added slowly while stirring with a variable speed mixer. At room temperature, the resultant emulsion was of such a viscosity that it could be poured or sprayed. Such a material could be used as a coating or as a sealant.

EXAMPLE 3

60 grams of sulfur reaction product #126 were heated to 95° C. To this heated material, 12 grams of vinyl toluene were added along with 1 gram of nonylphenoxypoly(ethyleneoxy)ethanol, then 60 grams of water at 75° C. were added slowly while stirring with a variable speed mixer. The resultant emulsion preferentially wetted silica sand. Applications for this emulsion would include stabilizing beach sands or as a coating over concrete or walk areas where sand would be embedded in the surface for skid resistance and as a binder for silacious aggregates.

EXAMPLE 4

200 grams of sulfur reaction product #233A were heated to 80° C. following which 0.5 gram of nonylphenoxypoly(oxyethylene)ethanol was added along with 10 grams of vinyl toluene. Then 100 grams of water at 80° C. were added slowly while stirring with a variable speed mixer. The resultant emulsion preferentially wetted limestone aggregate. Applications for this material include tack coats, seal coatings, and binders for concrete.

EXAMPLE 5

100 grams of sulfur reaction product #126 were heated to 95° C. following which 10 grams of vinyl toluene, 2 grams of a sodium phosphate ester (GAFAC GB-520) and 50 grams of water at 80° C. were added slowly with stirring. The resultant emulsion wetted both silica sand and limestone. An application of this emulsion would be as a binder for limestone and silica aggregates to form concrete.

We claim:

1. A method of making an emulsion of water in a sulfur reaction product, the latter being the reaction product of:
   (1) elemental sulfur;
   (2) from 5 to 20 weight percent of the sulfur reaction product of a first hydrocarbon;
      (a) which is polyunsaturated with the unsaturated portions being reactable with elemental sulfur,
      (b) which by itself when reacted with elemental sulfur forms a gel, and
   (3) from 5 to 20 weight percent of the sulfur reaction product of a second hydrocarbon;
      (a) which has one or more unsaturated groups reactable with elemental sulfur,
      (b) which by itself when reacted with sulfur does not form a gel but forms brittle product, and
      (c) which when the first and second hydrocarbons are so reacted with sulfur prevents said gel from forming;
   said sulfur reaction product being formed by causing the aforesaid reactants to undergo an exothermic reaction;
   said sulfur reaction product having a viscosity curve substantially that of asphalt, a penetration of from 5 to 100, a softening point of from 10° C. to 70° C. and a ductility of at least 100; comprising the steps of adding water free of added emulsifiers to a body of said sulfur reaction product to form said emulsion, the amount of said water added being from 2 to 50 weight percent of said emulsion.

2. The method of claim 1 wherein said sulfur reaction product is pre-heated to a temperature in the range of 50° to 100° C. before the water is added.

3. The method of claim 1 including the step of adding a hydrocarbon solvent to said sulfur reaction product in an amount from 3 to 20 percent of said sulfur reaction products, said emulsion containing from 20 to 50 weight percent water.

4. The method of claim 3 wherein the solvent is selected from the group of vinyl toluene, toluene, xylene and creosote.

5. The method of claim 3 including the step of adding a surface active wetting agent to said emulsion in an amount up to 5 weight percent of the emulsion.

6. An emulsion comprising water dispersed in a sulfur reaction product, the latter being the reaction product of:
   (1) elemental sulfur;
   (2) from 5 to 20 weight percent of the sulfur reaction product of a first hydrocarbon;
      (a) which is polyunsaturated with the unsaturated portions being reactable with elemental sulfur,
      (b) which by itself when reacted with elemental sulfur forms a gel, and
   (3) from 5 to 20 weight percent of the sulfur reaction product of a second hydrocarbon;
      (a) which has one or more unsaturated groups reactable with elemental sulfur,
      (b) which by itself when reacted with sulfur does not form a gel but forms brittle product, and
      (c) which when the first and second hydrocarbons are so reacted with sulfur prevents said gel from forming;
   said sulfur reaction product being formed by causing the aforesaid reactants to undergo an exothermic reaction;
   said sulfur reaction product having a viscosity curve substantially that of asphalt, a penetration of from 5 to 100, a softening point of from 10° C. to 70° C. and a ductility of at least 100; said emulsion being made by adding said water to said sulfur reaction product to form said emulsion, said water being present in an amount of 2 to 50 weight percent of said emulsion, said emulsion, being free from any added emulsifier.

7. The emulsion of claim 6 wherein the emulsion also contains a hydrocarbon solvent for said sulfur reaction product in an amount from 3 to 20 weight percent of said sulfur reaction product, said emulsion containing from 20 to 50 weight percent of water based on the weight of water and sulfur reaction product.

8. The method as claimed in claim 1, including the step of adding a hydrocarbon solvent to said sulfur reaction product in an amount from 3 to 20 weight percent of said sulfur reaction product at a temperature less than about 100° C.

9. The method as claimed in claim 8, wherein said emulsion contains from 20 to 50 weight percent water.

10. The method as claimed in claim 9, wherein said solvent is selected from the group consisting of vinyl toluene, toluene, xylene and cresote.

11. The method as claimed in claim 9, including the step of adding a surface active wetting agent to said emulsion in an amount up to 5 weight percent of said emulsion.

12. A method of making an emulsion of water in a sulfur reaction product, said sulfur reaction product being the reaction product of:
   (1) elemental sulfur;
   (2) from 5 to 20 weight percent of the sulfur reaction produce of a first hydrocarbon;
      (a) which is polyunsaturated with the unsaturated portions being reactable with elemental sulfur; and
      (b) which by itself when reacted with elemental sulfur forms a gel; and
   (3) from 5 to 20 weight percent of the sulfur reaction product of a second hydrocarbon;

(a) which has one or more unsaturated group reactable with elemental sulfur;
(b) which by itself when reacted with elemental sulfur does not form a gel but forms a brittle product; and
(c) which when the first and second hydrocarbons are so reacted with sulfur prevents said gel from forming;

said sulfur reaction product being formed by causing the aforesaid reactants to under go an exothermic reaction;

said sulfur reaction product having a viscosity curve substantially that of asphalt, a penetration of from 5 to 100, a softening point of from 10° C. to 70° C. and a ductility of at least 100, which comprises the steps of:

heating the sulfur reaction product to a temperature in the range of 50° C. to 100° C.;

adding a hydrocarbon solvent to the heated sulfur reaction product in an amount from 3 to 20 weight percent of said sulfur reaction product;

adding water to the heated sulfur reaction product in an amount from 2 to 50 weight percent of the emulsion.

13. The method as claimed in claim 12, wherein said solvent is selected from the group consisting of vinyl toluene, toluene, xylene and creosote.

14. The method as claimed in claim 12, including the step of adding a surface active wetting agent to said emulsion in an amount up to 5 weight percent of said emulsion.

15. A method of making an emulsion of water in a sulfur reaction product, said sulfur reaction product being the reaction product of:
(1) elemental sulfur;
(2) from 5 to 20 weight percent of the sulfur reaction product of a first hydrocarbon;
 (a) which is polyunsaturated with the unsaturated portions being reactable with elemental sulfur, and
 (b) which by itself when reacted with elemental sulfur forms a gel; and
(3) from 5 to 20 weight percent of the sulfur reaction product of a second hydrocarbon;
 (a) which has one or more unsaturated group reactable with elemental sulfur;
 (b) which by itself when reacted with elemental sulfur does not form a gel but forms a brittle product; and
 (c) which when the first and second hydrocarbons are so reacted with sulfur prevents said gel from forming;

said sulfur reaction product being formed by causing the aforesaid reactants to under go an exothermic reaction;

said sulfur reaction product having a viscosity curve substantially that of asphalt, a penetration of from 5 to 100, a softening point of from 10° C. to 70° C. and a ductility of at least 100, which comprises the steps of:

heating the reaction product to a temperature in the range of 50° C. to 100° C.;

adding a hydrocarbon solvent to the heated sulfur reaction product in an amount from 3 to 20 weight percent of said sulfur reaction product;

adding water to the heated sulfur reaction product in an amount from 2 to 50 weight percent of the emulsion;

adding a surface active wetting agent to the heated sulfur reaction product in an amount up to 5 weight percent of said emulsion.

16. An emulsion produced in accordance with the method as claimed in claim 1.

17. An emulsion produced in accordance with the method as claimed in claim 6.

18. An emulsion produced in accordance with the method as claimed in claim 12.

19. An emulsion produced in accordance with the method as claimed in claim 15.

* * * * *